United States Patent
Mezan

(10) Patent No.: US 6,622,065 B2
(45) Date of Patent: Sep. 16, 2003

(54) FLIGHT CONTROL DEVICE FOR AN AIRCRAFT, IN PARTICULAR FOR A HELICOPTER

(75) Inventor: Serge Mezan, Sausset-les-Pins (FR)

(73) Assignee: Eurocopter, Marignane (FR)

( * ) Notice: Subject to any disclaimer, the term of this patent is extended or adjusted under 35 U.S.C. 154(b) by 40 days.

(21) Appl. No.: 09/963,797

(22) Filed: Sep. 27, 2001

(65) Prior Publication Data

US 2002/0052675 A1 May 2, 2002

(30) Foreign Application Priority Data

Sep. 28, 2000 (FR) .......................................... 00 12345

(51) Int. Cl.$^7$ ................................................ G05D 1/00
(52) U.S. Cl. ........................................................ 701/4
(58) Field of Search ................... 701/1–8, 11, 16; 244/6, 17.13, 17.15, 17.17, 75 R, 76 R, 179–186, 220–221

(56) References Cited

U.S. PATENT DOCUMENTS

| | | | |
|---|---|---|---|
| 5,213,282 A | | 5/1993 | Gold et al. |
| 5,446,666 A | * | 8/1995 | Bauer ............................ 701/4 |
| 5,596,499 A | | 1/1997 | Glusman et al. |
| 5,931,421 A | * | 8/1999 | Surauer et al. .............. 244/165 |
| 6,415,879 B2 | * | 7/2002 | Kamen et al. ................ 180/8.2 |

FOREIGN PATENT DOCUMENTS

EP           1 037 130 A2 *   9/2000  ............ G05D/1/08

OTHER PUBLICATIONS

Damotte S et al., "Evaluation of Advanced Control Laws Using a Sidekick on the Experimental Fly–By–Wire Dauphin Helicopter", Proceedings of the European Rotorcraft Forum, FR, Paris, AAAF, vol. Forum 18, pp. 1–10, Sep. 15, 1992.

Garrard W. L. et al., "Design of Attitude and Rate Command Systems for Helicopters Using Eigenstructure Assignment", Journal of Guidance and Control and Dynamics, New York, vol. 12, No. 6, pp. 783–791, Nov. 1, 1989.

* cited by examiner

Primary Examiner—Thu Nguyen
(74) Attorney, Agent, or Firm—Stevens, Davis, Miller & Mosher, LLP

(57) ABSTRACT

A flight control device for an aircraft, in particular for a helicopter, includes, in addition to a control member and an actuator of a controlled member, a determination unit for determining a control command which corresponds to a translational rate control command, dependent on the deflection of the control member, while the translational rate of the aircraft is less than a reference value and which corresponds otherwise to a translational acceleration or angular rate control command, dependent on an extra deflection of the control member.

8 Claims, 2 Drawing Sheets

FLIGHT CONTROL DEVICE FOR AN AIRCRAFT, IN PARTICULAR FOR A HELICOPTER

FIELD OF THE INVENTION

The present invention relates to a flight control device for an aircraft, in particular for a helicopter.

SUMMARY OF THE INVENTION

This device which, within the context of the present invention, may be a device of the type having mechanical or electric flight controls comprises, in a known manner, for control with respect to at least one of the roll and pitch control axes considered in the present invention:
- at least one control member (stick or ministick) capable of being actuated by a pilot of the aircraft;
- at least one means of actuation (servocontrol) of a controlled member (rotor), to which a control command is applied; and
- means of determination for determining and transmitting to said means of actuation a control command dependent on an actuation value representative of the actuation of said control member.

Consequently, when the pilot of the aircraft actuates the roll or pitch control member, that is to say brings about a deflection of said control member, the means of determination determine, according to a predetermined control law, a control command, for example an angular rate control command, which is dependent on this deflection.

It is known that an angular rate control of the "RC" ("Rate Command") type, for which the deflection (longitudinal in the case of pitch or lateral in the case of roll) of the control member directly controls an angular rate of pitch or of roll about the relevant axis of the aircraft, proves to be especially well suited to maneuvers of large amplitude.

Of course, other types of control laws are known. In particular, control laws which implement:
- a translational rate control of the "TRC" "Translational Rate Command") type, for which a longitudinal or lateral deflection of the control member or stick directly controls a longitudinal or lateral translational rate along the axis (of pitch or roll), which proves to be especially well suited for the hovering or low-speed phases, close to the ground or to obstacles, and in particular under conditions of degraded visibility; and
- a translational acceleration control of the "AcC" ("Acceleration Command") type, for which a longitudinal or lateral deflection of the stick directly controls a longitudinal or lateral translational acceleration along the axis (this being very similar in fact to the direct control of pitch or roll attitude about the axis), which proves to be especially well suited for the cruising flight phases, and in particular for the tactical flight phases.

However, irrespective of the relevant control axis (roll or pitch) and irrespective of the type of aircraft used, it is not possible to simultaneously employ, or even to combine, various types of control (angular rate control, translational rate control or translational acceleration control). Consequently, irrespective of the control used, there are always flight phases for which this control is hardly appropriate.

By way of illustration, it will be recalled that:
- in helicopters having mechanical flight controls, not fitted with an automatic pilot, the dynamic pitch or roll response is naturally of the "RC" (angular rate) type;
- in helicopters having mechanical flight controls, fitted with an automatic pilot, the dynamic pitch or roll response is generally again of the "RC" (angular rate) type, since the authority of the control system is too little to be able to modify the response; and
- in helicopters having electric flight controls with so-called "objective-based" control laws, the type of the response may be modified into the "TRC" (translational rate) type or "AcC" (translational acceleration) type.

The present invention relates to a (mechanical or electric) flight control device for an aircraft, in particular for a helicopter, which makes it possible to remedy the aforesaid drawbacks.

For this purpose, according to the invention, said flight control device for an aircraft, of the type comprising for control with respect to at least one control axis:
- at least one control member capable of being actuated by a pilot of the aircraft which produces a deflection of said control member;
- at least one means of actuation of a controlled member to which a control command is applied; and
- means of determination for determining and transmitting to said means of actuation a control command dependent on an actuation value representative of the actuation of said control member, is noteworthy in that it comprises, moreover, at least one first sensor for determining a first effective value corresponding to the effective value of the translational rate of the aircraft, and in that said means of determination are formed in such a way as to determine as control command to be applied to said means of actuation:
- while said first effective value is less than or equal to a first reference value corresponding to a predetermined reference value of the translational rate, a first control command corresponding to a translational rate control command, which is dependent on the deflection of the control member; and
- when said first effective value is greater than said first reference value, at least one second control command, which is different from a translational rate control command and which is dependent on an extra deflection of the control member.

Thus, by virtue of the invention:
- while the translational rate is small (namely less than the first reference value), the aircraft is controlled by a translational rate control (TRC), which, as is known, proves to be especially well suited for the hovering or low-speed phases, close to the ground or to obstacles, and in particular under conditions of degraded visibility, that is to say for low speeds; and
- when the speed becomes greater, the aircraft is controlled according to at least one other type of control, as specified hereinbelow, which is different from a translational rate control and which is suited to high speeds, thereby making it possible to remedy the fact that a translational rate control exhibits a small flight domain (defined around a reference rate) which is no longer suited to the higher speeds, considered in the present case.

In a first embodiment, said second control command is a translational acceleration control command (AcC), which is dependent on the extra deflection beyond the deflection producing a translational rate which is equal to said first reference value.

In a second embodiment, said second control command is an angular rate control command (RC), which is dependent on the extra deflection beyond the deflection producing a translational rate which is equal to said first reference value.

Thus, an advantageous compromise is obtained between a control law (TRC law) suitable for carrying out precision maneuvers and a control law (RC law) which is sufficiently maneuverable to cover all of the flight domain.

In a third preferred embodiment, said device furthermore comprises at least one second sensor for determining a second effective value corresponding to the effective value of the translational acceleration of the aircraft, and said means of determination are formed in such a way as to determine as second control command:

while said second effective value is less than or equal to a second reference value corresponding to a predetermined reference value of the translational acceleration, a translational acceleration control command, which is dependent on the extra deflection beyond the deflection producing a translational rate which is equal to said first reference value; and when said second effective value is greater than said second reference value, an angular rate control command, which is dependent on the extra deflection beyond the deflection producing a translational acceleration which is equal to said second reference value.

Thus, the three types of control (TRC, AcC, RC) are combined. Moreover, each control is rendered active in the flight domain where it is most efficacious, thereby making it possible to marry the advantages of said three controls.

For this purpose, in addition to the aforesaid advantages of translational rate control (TRC), it is known that:

translational acceleration control (AcC) which covers a more extensive flight domain and makes it possible to manage rate deviations (possibility of accelerating and of decelerating) is especially well suited to the cruising flight phases, in particular the tactical flight phases; and angular rate control (RC) which covers a broad flight domain is especially well suited to dynamic maneuvers of large amplitude (that is to say for high translational rates and translational accelerations).

In a fourth particular embodiment, said flight control device for an aircraft, in particular for a helicopter, of the type comprising for control with respect to at least one control axis:

at least one control member capable of being actuated by a pilot of the aircraft which produces a deflection of said control member;

at least one means of actuation of a controlled member to which a control command is applied; and means of determination for determining and transmitting to said means of actuation a control command dependent on an actuation value representative of the actuation of said control member, furthermore comprises at least one sensor for determining an effective value of the translational acceleration of the aircraft, and said means of determination are formed in such a way as to determine as control command to be applied to said means of actuation:

while said effective value is less than or equal to a predetermined reference value of the translational acceleration, a translational acceleration control command, which is dependent on the deflection of the control member; and when said effective value is greater than said reference value, an angular rate control command, which is dependent on the extra deflection beyond the deflection producing a translational acceleration which is equal to said reference value.

Of course, the flight control device in accordance with the invention may be applied equally well to control with respect to the roll control axis as to control with respect to the pitch control axis.

Moreover, in a particular embodiment, said device comprises control members, means of actuation, sensors and means of determination for controlling the aircraft with respect to each of the roll and pitch control axes of said aircraft.

The figures of the appended drawing will elucidate the manner in which the invention may be embodied. In these figures, identical references designate similar elements.

DESCRIPTION OF THE PREFERRED EMBODIMENTS

Figure 1:
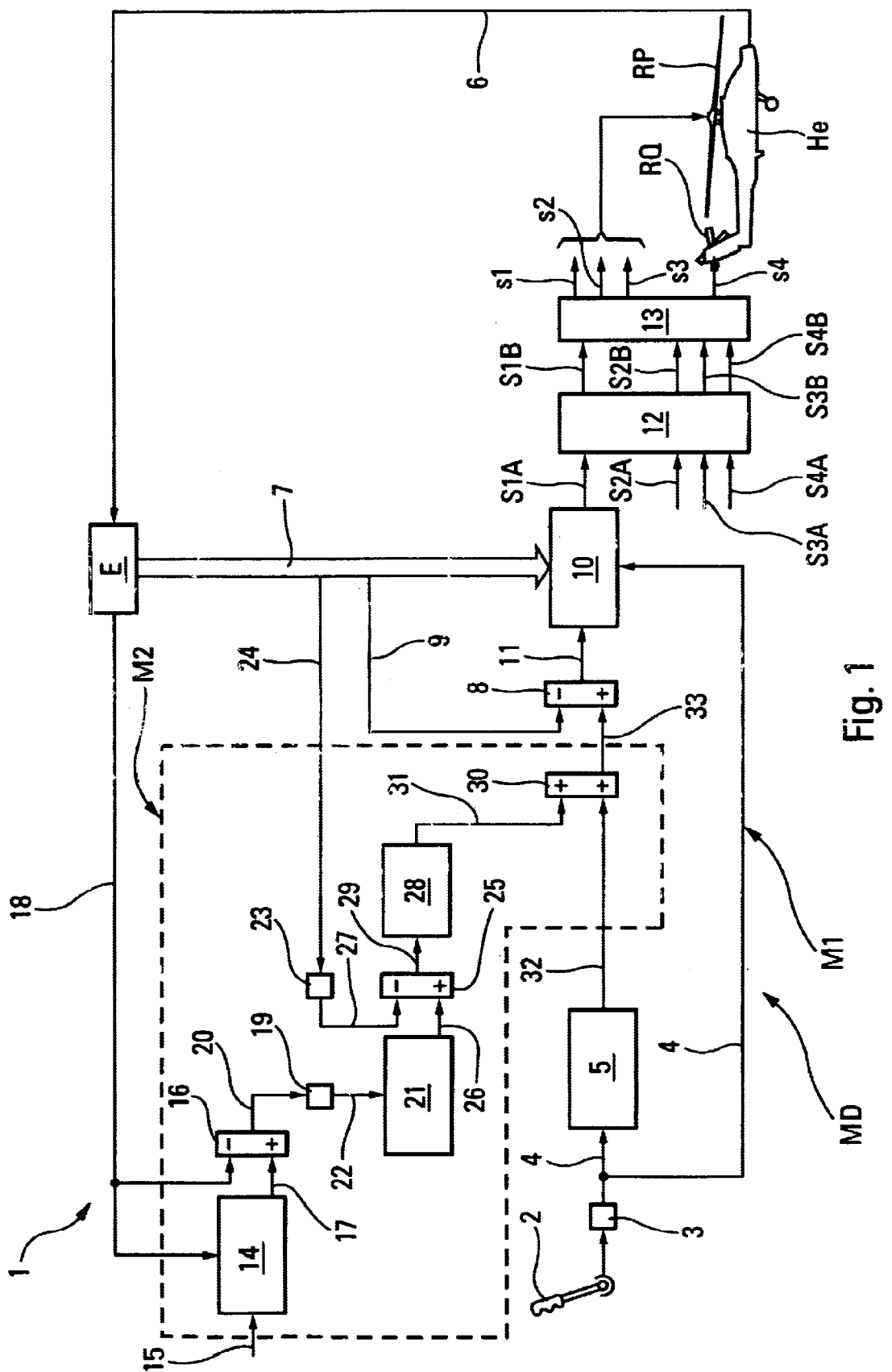
FIG. 1 is the schematic layout of a flight control device in accordance with the invention.

The device 1 represented schematically in FIG. 1 is mounted on board an aircraft, in this instance a helicopter He to be controlled, although, for reasons of clarity of the drawing, the helicopter He is represented on a reduced scale, outside said device 1. Said helicopter He comprises at least one main rotor RP intended to provide for uplift, forward motion and pitch and roll control, as well as a tail rotor RQ or any other device intended to provide for lateral equilibrium and, possibly, yaw control of the helicopter He.

In a known manner, said device 1 comprises for control with respect to at least one control axis (roll, pitch, yaw):

a control member 2 (stick or ministick) capable of being actuated by a pilot of the helicopter He;

means of actuation (for example servocontrols), not represented, of controlled members (rotors RP, RQ) to which control commands are applied; and means of determination MD for determining and transmitting to said means of actuation control commands, and in particular a control command dependent on a value V1 representative of the actuation of said control member 2.

According to the invention, said device 1 furthermore comprises at least one first standard sensor for determining a first effective value corresponding to the effective value of the translational rate of the aircraft He, and said means of computation MD are formed in such a way as to determine as control command to be applied to said means of actuation:

while said first effective value is less than or equal to a first reference value corresponding to a predetermined reference value of the translational rate of the aircraft He, a first control command corresponding to a translational rate control command (TRC), which is dependent on the deflection of the control member 2; and when said first effective value is greater than said first reference value, at least one second control command specified hereinbelow, which is different from a translational rate control command and which is dependent on an extra deflection of the control member 2.

It will be noted that the aforesaid functions may be nonlinear functions or proportional laws. Thus, the first and second aforesaid commands may for example be proportional, respectively to said deflection and to said extra deflection.

In a first embodiment, said second control command is a translational acceleration control command (AcC), which is dependent on the extra deflection (of the control member 2) beyond the deflection producing a translational rate which is equal to said first reference value.

Moreover, in a second embodiment, said second control command is an angular rate control command (RC), which is dependent on the extra deflection beyond the deflection producing a translational rate which is equal to said first reference value.

In these two embodiments, just two types of control (TRC and AcC; TRC and RC) are combined each time.

In a preferred embodiment, the three types of control are combined. To do this, said device 1 furthermore comprises at least one second standard sensor E for determining a second effective value corresponding to the effective value of the translational acceleration of the aircraft He, and said means of determination MD are formed in such a way as to determine as second control command:

while said second effective value is less than or equal to a second reference value corresponding to a predetermined reference value of the translational acceleration (AcC), a translational acceleration control command, which is dependent on the extra deflection beyond the deflection producing a translational rate which is equal to said first reference value; and when said second effective value is greater than said second reference value, an angular rate control command (RC), which is dependent on the extra deflection beyond the deflection producing a translational acceleration which is equal to said second reference value.

Thus, each control (TRC, AcC and RC) is active in the flight domain where it is most effective, thereby making it possible to marry the advantages of the three controls.

For this purpose, it will be recorded that:

translational rate control (TRC) which covers a very small flight domain is especially well suited to the hovering or low-speed phases, close to the ground or to obstacles, and in particular under conditions of degraded visibility;

translational acceleration control (AcC) which covers a more extensive flight domain and makes it possible to manage rate deviations (possibility of accelerating and of decelerating) is especially well suited to the cruising flight phases, in particular the tactical flight phases; and angular rate control (RC) which covers a broad flight domain is especially well suited to dynamic maneuvers of large amplitude (that is to say for high translational rates and translational accelerations).

In a fourth particular embodiment, said flight control device for an aircraft, in particular for a helicopter, of the type comprising for control with respect to at least one control axis:

at least one control member capable of being actuated by a pilot of the aircraft which produces a deflection of said control member;

at least one means of actuation of a controlled member to which a control command is applied; and means of determination for determining and transmitting to said means of actuation a control command dependent on an actuation value representative of the actuation of said control member, moreover comprises at least one sensor for determining an effective value of the translational acceleration of the aircraft, and said means of determination are formed in such a way as to determine as control command to be applied to said means of actuation:

while said effective value is less than or equal to a predetermined reference value of the translational acceleration, a translational acceleration control command, which is dependent on the deflection of the control member; and when said effective value is greater than said reference value, an angular rate control command, which is dependent on the extra deflection beyond the deflection producing a translational acceleration which is equal to said reference value.

Within the context of the present invention, the flight control device can be a device having mechanical controls, so that said means of determination comprise in particular a control linkage and a jack.

However, in the preferred embodiment represented in FIG. 1, the device 1 is an electric flight control device. Also, said means of determination MD comprise first known means M1 for angular rate control with respect to a control axis (in the example represented and described hereinbelow, it is considered by way of non limiting example that this axis is the roll control axis; it could also be the pitch control axis), which comprise:

a sensor 3 detecting the value V1 representing the roll position of, or the force applied to, the (cyclic pitch) stick 2;

a computation unit 5 which transforms this value V1 received from the sensor 3 via a link 4, into an angular rate control VANGCOM;

an assembly E of sensors mounted on board the helicopter He (as illustrated by a link 6) and delivering (as illustrated by an arrow 7) in the form of electrical signals a plurality of information items regarding the states of said helicopter He, such as the air speed, the angular rates, the angular accelerations, the attitudes and the load factors, as well as the angular rate of roll VANG;

a computation unit 8 which computes the difference EVANG between, on the one hand, a preset value VANGCONS dependent on the value VANGCOM which is received from the computation unit 5 and, on the other hand, the value VANG transmitted by the assembly E of sensors (via the links 7 and 9). It will be noted that, in the known flight control devices, VANGCONS is equal to VANGCOM, this not being the case in the improvement in accordance with the present invention, as will be seen hereinbelow;

a corrector 10 connected by links 7, 4 and 11 respectively to the assembly E of sensors, to the sensor 3 and to the computation unit 8, which is intended to slave VANG to VANGCONS, that is to say slave to 0 the error signal EVANG received from the unit 8. This corrector 10 is also responsible, based on information received from the assembly E, for the stability and decoupling of the axis of the control loop, and incorporates, based on the information about the roll control command, a precontrol function for modulating the passband;

a controls decoupling unit 12 which performs a decoupling of the controls which are received, in respect of the roll control via a link S1A, and in respect of the controls for the other axes (pitch, yaw, collective) via links S2A, S3A and S4A; and a commands mixer 13 receiving, via links S1B to S4B, the commands emanating from the unit 12 and addressing control commands, via links s1 to s3, to the servocontrols of the main rotor RP and, via a link s4, to the servocontrol of the tail rotor RQ.

According to the invention, said device 1 furthermore comprises second means M2 which, associated with said first known means M1, form said means of determination (MD) in accordance with the invention.

In the preferred embodiment represented in FIG. 1, said second means M2 comprise:
- a means 14 for determining a reference rate VREF. This reference rate VREF may be modified via a manual action by an operator or a pilot or via an automatic action, as illustrated by an arrow 15. The means 14 may use, for this purpose, information and in particular the lateral ground speed VSOL, received by a link 18 from the assembly E of sensors;
- a means 16 computing the difference between the speed VSOL and the reference rate VREF received via a link 17;
- a means 19 connected by a link 20 to the means 16, which processes this difference via a predetermined function so as to obtain a value ECVSOL. In particular, the means 19 can, for this purpose, multiply said difference by a predetermined gain KV;
- a means of limitation 21 receiving this value ECVSOL via a link 22 and limiting said value to a value L1, if |ECVSOL| is greater than L1. The means of limitation 21 thus outputs a value ECVSOLL which is equal:
  - to ±L1 (depending on the sign of ECVSOL), if |ECVSOL|>L1; and
  - to ECVSOL, if |ECVSOL|≦L1;
- a means 23 which processes the measurement of the ground acceleration information DVSOL, formulated by the assembly E of sensors and received via a link 24 connected to the link 7, via a predetermined function so as to obtain a value KDVSOL. In particular, said means 23 can, for this purpose, multiply said measurement DVSOL by a predetermined gain KDV;
- a means 25 computing the difference ECDVSOL between the values ECVSOLL and KDVSOL received respectively by way of links 26 and 27;
- a means of limitation 28 receiving this difference ECDVSOL via a link 29 and limiting said difference to a predetermined value L2, if |ECDVSOL| is greater than L2. According to the invention, L2 is greater than L1. The means of limitation 28 thus outputs a value ECDVSOLL which is equal:
  - to ±L2 (depending on the sign of ECDVSOL), if |ECDVSOL|>L2; and
  - to ECDVSOL, if |ECDVSOL|≦L2; and
- a means 30 which computes a preset angular rate VANGCONS such that:

$$VANGCONS = ECDVSOLL + VANGCOM,$$

the values ECDVSOLL and VANGCOM being received respectively via links 31 and 32.

This preset value VANGCONS is transmitted via a link 33 to the computation unit 8, which computes the difference between VANG and VANGCONS, this difference being slaved to zero by the corrector 10. The corrector 10 therefore seeks to obtain the relation:

$$VANG = VANGCOM + ECDVSOLL$$

that is to say, expanding ECDVSOLL:

$$VANG = VANGCOM + [[ECVSOL]_{lim\ to\ L1} - KDVSOL]_{lim\ to\ L2}$$

which in the particular case where $$\begin{cases} ECVSOL = KV \times (VREF - VSOL) \\ KDVSOL = KDV \times DVSOL \end{cases}$$

may be written:

$$VANG = VANGCOM + [[KV \times (VREF - VSOL)]_{lim\ to\ L1} - KDV \times DVSOL]_{lim\ to\ L2}$$

Consequently, in the aforesaid particular case, according to the invention:

A/ firstly, when ECVSOL and ECDVSOL are not limited, we have the relation:

$$VANG = VANGCOM + KV \times (VREF - VSOL) - KDV \times DVSOL$$

At equilibrium, VSOL=constant=>VANG=DVSOL=0. We thus have the relation:

$$VANGCOM = KV \times (VSOL - VREF)$$

Thus, through VANGCOM, the pilot controls a lateral rate deviation VSOL of amplitude VANGCOM/KV about the reference rate VREF.

A control law of the "TRC" (translational rate control) type is therefore obtained;

B/ secondly, when ECVSOL is limited and ECDVSOL is not limited, we have the relation:

$$VANG = VANGCOM \pm L1 - KDV \times DVSOL$$

At equilibrium, DVSOL=constant=>VANG=0. We thus have the relation:

$$VANGCOM = KDV \times DVSOL \pm L1$$

or again:

$$DVSOL = (VANGCOM \pm L1)/KDV$$

Thus, through VANGCOM corrected of the bias L1, the pilot controls a lateral acceleration DVSOL. A control law of the "AcC" (translational acceleration control) type is therefore obtained; and C/ thirdly, when ECDVSOL is limited, we have the relation:

$$VANG = VANGCOM \pm L2$$

Thus, through VANGCOM corrected of the bias L2, the pilot controls an angular rate.

A control law of the "RC" (angular rate control) type is therefore obtained.

Figure 2:
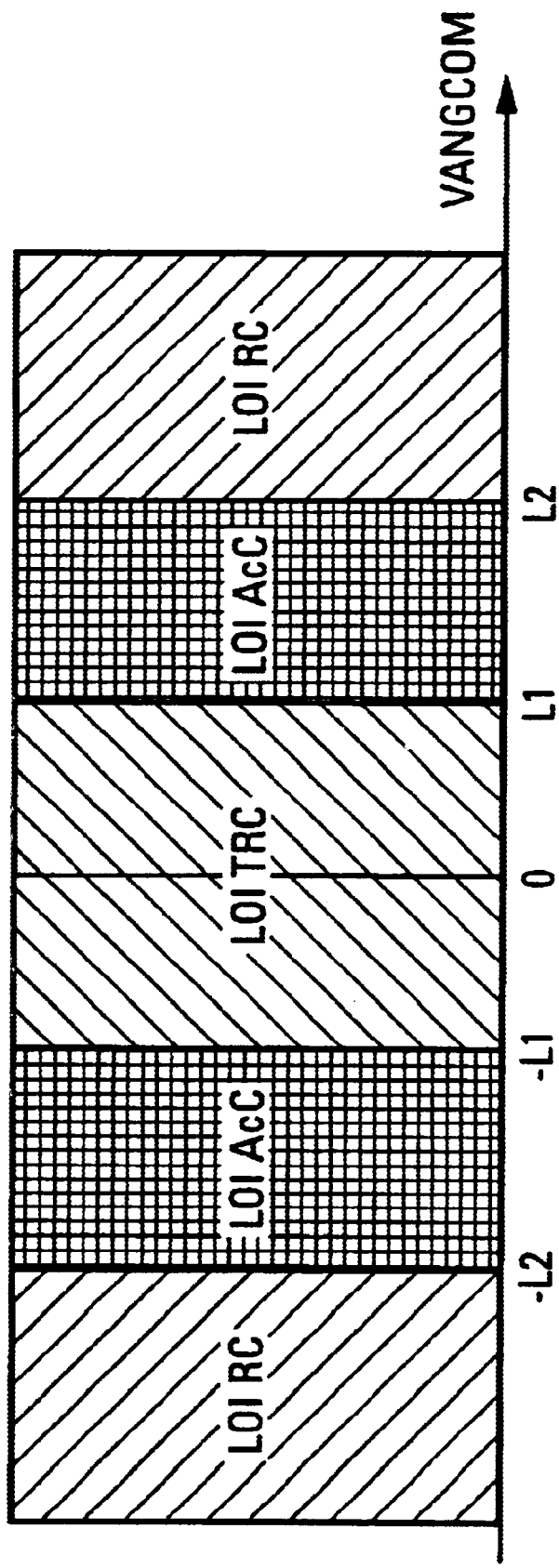
FIG. 2 is a diagram illustrating the operating ranges of the various control laws as a function of the controlled angular rate.

It will moreover be noted that:
at equilibrium, the operating ranges of the various control laws may therefore be delimited as a function of the control VANGCOM (see FIG. 2), namely:
RC law for |VANGCOM|>L2;
AcC law for L2>|VANGCOM|>L1; and
TRC law for |VANGCOM|<L1;
the pure TRC law can be obtained with L1=L2=∞;
the pure AcC law can be obtained with L1=0 and L2=∞ (the measurement of VSOL is then not necessary);
the pure RC law can be obtained with L1=L2=0 (the measurements of VSOL and DVSOL are then not necessary);

the mixed "TRC/Acc" law can be obtained with 0<L1<L2=∞;

the mixed "AcC/RC" law can be obtained with 0=L1<L2<∞ (the measurement of VSOL is then not necessary); and the mixed "TRC/RC" law can be obtained with L1=L2.

The above-presented device 1 in accordance with the invention for roll control can be applied by analogy to pitch control (with, in this case, longitudinal accelerations and rates, instead of the aforesaid lateral accelerations and rates specified for roll control).

Moreover, the present invention can be implemented simultaneously for both these control axes of the helicopter He or of any other aircraft, in particular of a fixed-wing aircraft.

What is claimed is:

1. A flight control device for an aircraft, in particular for a helicopter, for controlling at least one control axis:

at least one control member, capable of being actuated by a pilot of the aircraft, for producing a deflection of said control member;

at least one actuation means for actuating a controlled member to which a control command is applied;

determination means for determining and transmitting to said actuation means a control command dependent on an actuation value representative of the actuation of said control member;

at least one first sensor for determining a first effective value corresponding to the effective value of the translational rate of the aircraft, and wherein:

said determination means is formed in such a way as to determine a control command to be applied to said means of actuation such that:

while said first effective value is less than or equal to a first reference value corresponding to a predetermined reference value of the translational rate, a first control command corresponding to a translational rate control command, which is dependent on the deflection of the control member, is generated; and when said first effective value is greater than said first reference value, at least one second control command, which is different from said translational rate control command and which is dependent on an extra deflection of the control member, is generated.

2. The device as claimed in claim 1, wherein said second command is a translational acceleration control command, which is dependent on the extra deflection beyond the deflection producing a translational rate which is equal to said first reference value.

3. The device as claimed in claim 1, wherein said second control command is an angular rate control command, which is dependent on the extra deflection beyond the deflection producing a translational rate which is equal to said first reference value.

4. The device as claimed in claim 1, which device furthermore comprises at least one second sensor for determining a second effective value corresponding to the effective value of the translational acceleration of the aircraft, and in said flight control device said means of determination are formed in such a way as to determine a second control command such that:

while said second effective value is less than or equal to a second reference value corresponding to a predetermined reference value of the translational acceleration, a translational acceleration control command, which is dependent on the extra deflection beyond the deflection producing a translational rate which is equal to said first reference value, is generated; and when said second effective value is greater than said second reference value, an angular rate control command, which is dependent on the extra deflection beyond the deflection producing a translational acceleration which is equal to said second reference value, is generated.

5. The device as claimed in claim 1, wherein said control axis is the roll control axis.

6. The device as claimed in claim 1, wherein said control axis is the pitch control axis.

7. The device as claimed in claim 1, which device comprises control members, means of actuation, sensors and means of determination for controlling the aircraft with respect to each of the roll and pitch control axes of the aircraft.

8. A flight control device for an aircraft, in particular for a helicopter, for controlling at least one control axis:

at least one control member, capable of being actuated by a pilot of the aircraft, for producing a deflection of said control member;

at least one actuation means for actuating a controlled member to which a control command is applied;

determination means for determining and transmitting to said actuation means a control command dependent on an actuation value representative of the actuation of said control member;

at least one sensor for determining an effective value of the translational acceleration of the aircraft, and wherein:

said determination means is formed in such a way as to determine a control command to be applied to said actuation means such that:

while said effective value is less than or equal to a predetermined reference value of the translational acceleration, a translational acceleration control command, which is dependent on the deflection of the control member, is generated; and when said effective value is greater than said reference value, an angular rate control command, which is dependent on the extra deflection beyond the deflection producing a translational acceleration which is equal to said reference value, is generated.

* * * * *